United States Patent
Li et al.

(10) Patent No.: US 12,267,497 B2
(45) Date of Patent: Apr. 1, 2025

(54) FLASH DETECTION FOR VIDEO CODING

(71) Applicant: ATI Technologies ULC, Markham (CA)

(72) Inventors: Jin Li, Markham (CA); Crystal Yeong-Pian Sau, Markham (CA)

(73) Assignee: ATI Technologies ULC, Markham (CA)

(*) Notice: Subject to any disclaimer, the term of this patent is extended or adjusted under 35 U.S.C. 154(b) by 37 days.

(21) Appl. No.: 18/334,963

(22) Filed: Jun. 14, 2023

(65) Prior Publication Data

US 2024/0422317 A1  Dec. 19, 2024

(51) Int. Cl.
*H04N 19/124* (2014.01)
*G06T 5/40* (2006.01)
*H04N 19/159* (2014.01)
*H04N 23/56* (2023.01)

(52) U.S. Cl.
CPC ............. *H04N 19/124* (2014.11); *G06T 5/40* (2013.01); *H04N 19/159* (2014.11); *H04N 23/56* (2023.01)

(58) Field of Classification Search
CPC .... H04N 19/124; H04N 19/159; H04N 23/56; G06T 5/40

USPC ..................................................... 375/240.03
See application file for complete search history.

(56) References Cited

U.S. PATENT DOCUMENTS

2016/0360215 A1* 12/2016 Rusanovskyy ...... H04N 19/186
2017/0155903 A1*  6/2017 Rosewarne ........... H04N 19/13

FOREIGN PATENT DOCUMENTS

WO     WO2020050705 A1 *  3/2020  ............. H04N 19/70

OTHER PUBLICATIONS

Bovik, A., "The Essential Guide to Image Processing", Elsevier Inc., 2009, pp. 44-47.

* cited by examiner

*Primary Examiner* — Marnie A Matt
(74) *Attorney, Agent, or Firm* — Volpe Koenig

(57) ABSTRACT

A technique for performing video operations is provided. The technique includes characterizing a frame as a flash frame; setting the flash frame as a non-intra frame; prohibiting encoding of frames other than the flash frame with reference to the flash frame; and applying a positive quantization parameter ("QP") offset to the flash frame.

20 Claims, 5 Drawing Sheets

FLASH DETECTION FOR VIDEO CODING

BACKGROUND

Video encoding and decoding are processes by which video is compressed to greatly reduce the amount of data needed to represent the video. Improvements to video encoding and decoding are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing video operations is provided. The technique includes characterizing a frame as a flash frame; setting the flash frame as a non-intra frame; prohibiting encoding of frames other than the flash frame with reference to the flash frame; and applying a positive quantization parameter ("QP") offset to the flash frame.

Figure 1:
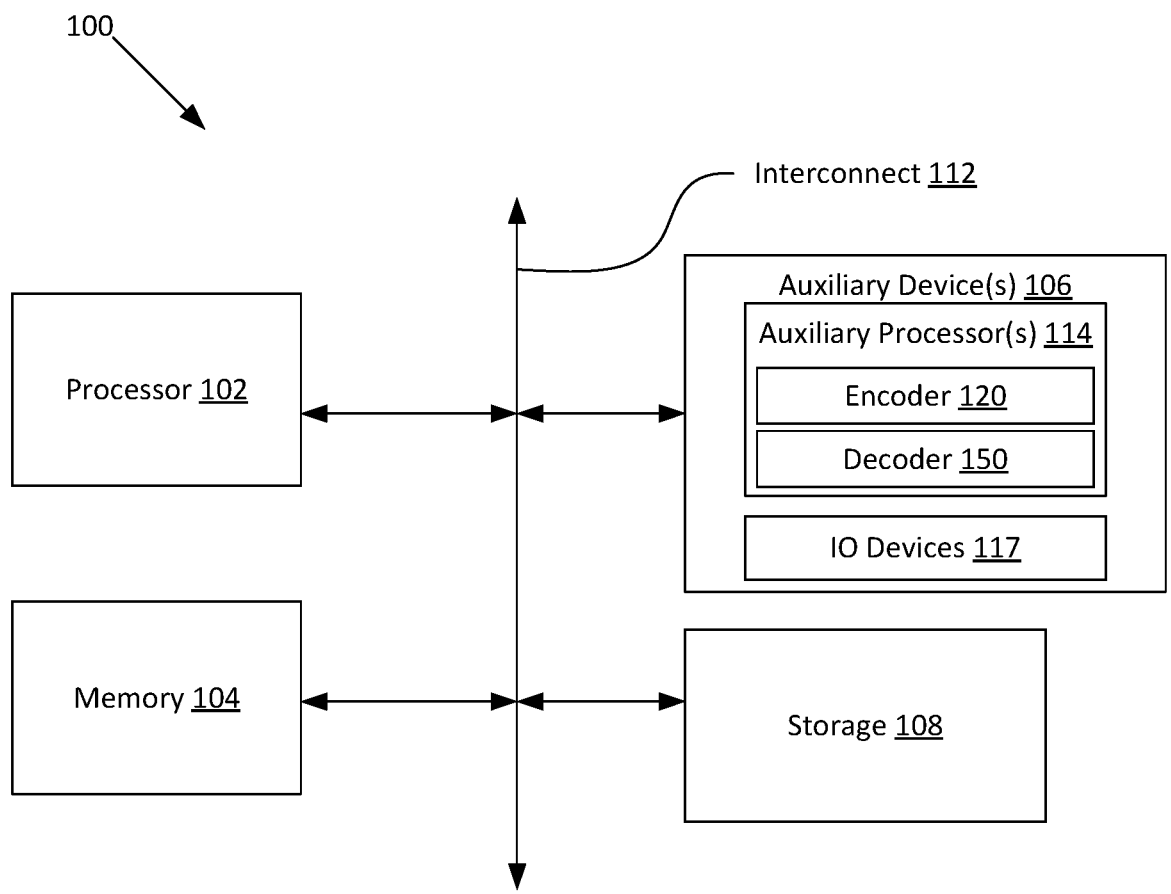
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 108, an one or more auxiliary devices 106. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary processors 114 includes one or both of an encoder 120 and a decoder 150. An encoder 120 generates encoded video based on input video. The encoded video is compressed according to any technically feasible standard or technique, such as H.264, H.265, AV1, VP9, or any other compression standard or technique. A decoder consumes encoded video and generates decoded video as output, for some purpose such as display, storage, editing, transmission, or any other purpose. Encoding video generally includes converting a raw video format, which specifies raw data (e.g., colors per pixel), into an encoded format, which is, in some examples, compressed. The encoding may result in a reduction of the amount of data needed for storage of the video (compression) and/or may result in a loss of quality (lossy encoding). Although a single device is illustrated with both an encoder 120 and a decoder 150, it should be understood that in some examples, the encoder 120 is included in a different device than the decoder 150. In other words, in some examples, a first device includes an encoder 120 and a second device includes a decoder 150. The first device encodes video using the encoder 120, and sends that video to the second device, which decodes that video using the decoder 150.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

The video encoder 120 and video decoder 150 are each implemented as software, hardware (e.g., a fixed function circuit, a processor, or other circuit configured to perform the operations described herein), or a combination thereof. In some examples, the encoder 120 or decoder 150 is stored as software in memory 104 and executed by the processor 102. In other examples, the encoder 120 or decoder 150 is fixed function hardware controlled at the direction of the processor 102. In yet another example, the encoder 120 or decoder 150 is included within a graphics processing device.

Figure 2A:
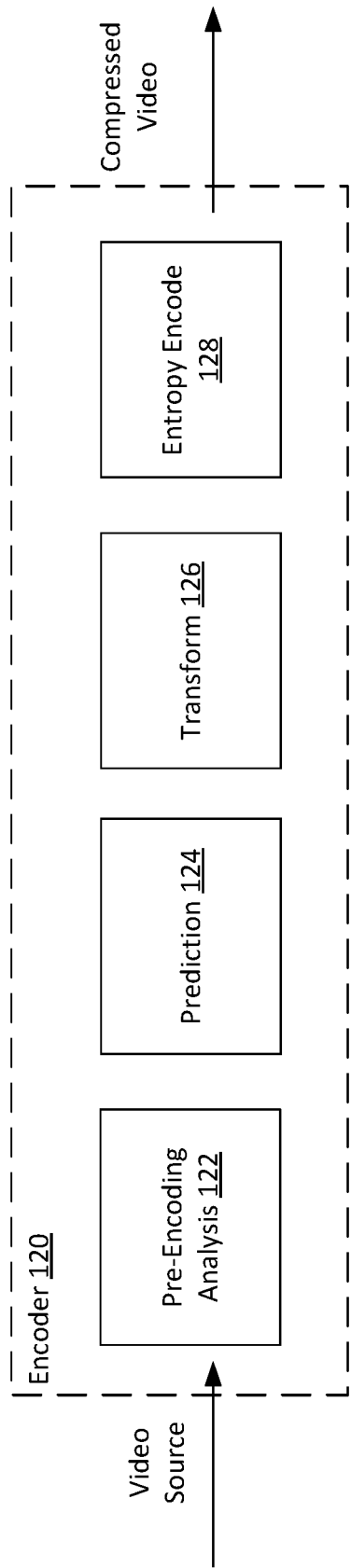
FIG. 2A presents a detailed view of the encoder of FIG. 1, according to an example.

FIG. 2A presents a detailed view of the encoder 120 of FIG. 1, according to an example. The encoder 120 accepts source video, encodes the source video to produce compressed video (or "encoded video"), and outputs the compressed video along with shade metadata. The encoder 120 includes a pre-encoding analysis block 122, a prediction block 124, a transform block 126, and an entropy encode block 128. In some alternatives, the encoder 120 implements one or more of a variety of video encoding standards (such as MPEG2, H.264, or other standards), with the prediction block 124, transform block 126, and entropy encode block 128 performing respective portions of those standards and the pre-encoding analysis block 122 not being a part of a standard. In other alternatives, the encoder 120 implements a video encoding technique that is not a part of any standard.

The prediction block 124 performs prediction techniques to reduce the amount of explicit information needed to be stored for a particular frame. Various prediction techniques are possible. One example of a prediction technique is a motion prediction based inter-prediction technique, where a block in the current frame is compared with different groups of pixels in the same or a different frame until a match is found. Various techniques for finding a matching block are possible. One example is a sum of absolute differences technique, where characteristic values (such as luminance) of each pixel of the block in the current block is subtracted from characteristic values of corresponding pixels of a candidate block, and the absolute values of each such difference are added. This subtraction is performed for a number of candidate blocks in a search window. The candidate block with the best score such as the lowest sum of absolute differences is deemed to be a match. After finding a matching block, the current block is subtracted from the matching block to obtain a residual. The residual is further encoded by the transform block 126 and the entropy encode block 128 and the block is stored as the encoded residual plus the motion vector in the compressed video.

The transform block 126 performs an encoding step which is typically though not necessarily lossy, and converts the data of the block into a compressed format. An example transform that is typically used is a discrete cosine transform (DCT). The discrete cosine transform converts data for the block (where prediction is used, the residual of the block) into a sum of weighted visual patterns, where the visual patterns are distinguished by the frequency of visual variations in two different dimensions. The weights afforded to the different patterns are referred to as coefficients. These coefficients are quantized and are stored together as the data for the block. Quantization is the process of assigning one of a finite set of values to a coefficient. The total number of values that are available to define the coefficients of any particular block is defined by the quantization parameter (QP). A higher QP means that the step size between values having unity increment is greater, which means that a smaller number of values are available to define coefficients. A lower QP means that the step size is smaller, meaning that a greater number of values are available to define coefficients. A lower QP requires more bits to store, because more bits are needed for the larger number of available coefficient values, and a higher QP requires fewer bits. Visually, a higher QP is associated with less detail and a lower QP is associated with more detail.

The entropy encode block 128 performs entropy coding on the coefficients of the blocks. Entropy coding is a lossless form of compression. Examples of entropy coding include context-adaptive variable-length coding and context-based adaptive binary arithmetic coding. In general, the entropy coding involves reducing the amount of data required to store a set of data by reducing the number of possible values that can be stored in that set of data. The entropy coded transform coefficients describing the residuals, the motion vectors, and other information such as per-block QPs are output and stored or transmitted as the encoded video.

The pre-encoding analysis block 122 performs operations for assigning reference type information and for determining whether to apply a quantization parameter offset to video being encoded by the encoder 120. Through these actions, the pre-encoding analysis block 122 is capable of compensating for the negative effects of frames that include "flashes," or momentary and high increases in brightness. It is possible for a flash of sufficient intensity to be interpreted by the encoder 120 as a scene change. Generally, an encoder 120 encodes the frame that begins a scene change as an "I-frame." An I-frame is a frame encoded without using references to other frames. More specifically, as described elsewhere herein, the encoder 120 (e.g., the prediction 124) generates prediction information and residuals. The prediction information includes a references to another block, such as a block of the same frame or a different frame. With I-frames, all such references in a frame do not refer to blocks of other frames.

In general, encoding a frame as an I-frame increases the amount of data consumed by that frame, because options for encoding are removed. In other words, by removing the ability to reference other frames, the opportunities for compression are lost. For at least this reason, encoding a frame with a "flash" as an I-frame can result in a performance loss. Further, encoding such a frame as an I-frame, which results in a greater consumption of data for that frame, leaves less of a running bit budget for other frames. In addition to the above, encoding such a frame as an I-frame while allowing other frames to reference that frame could cause an increased consumption of data in such other frames, due to the great divergence of luminance for such I-frame.

For at least these reasons, the pre-encoding analysis block 122 includes a flash detector that, upon detecting a flash in a frame, causes that frame to be encoded not as an I-frame, but as a frame that is able to be encoded with reference to other frames but that cannot be referenced by other frames. In addition, in some examples, the pre-encoding analysis block 122 applies a positive quantization parameter offset to such frame (thus reducing the amount of data consumed by that frame), to leave addition bit budget for other frames such as subsequent frames.

Figure 2B:
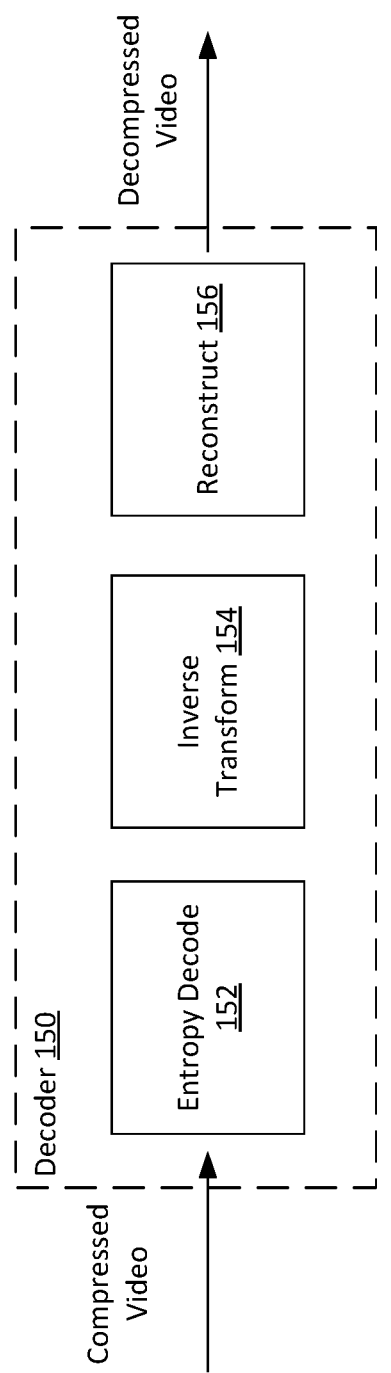
FIG. 2B represents a decoder for decoding compressed data generated by an encoder such as the encoder of FIG. 2A, according to an example.

FIG. 2B represents a decoder 150 for decoding compressed data generated by an encoder such as the encoder 120, according to an example. The decoder 150 includes an entropy decoder 152, an inverse transform block 154, and a reconstruct block 156. The entropy decoder 152 converts the entropy encoded information in the compressed video, such as compressed quantized transform coefficients, into raw (non-entropy-coded) quantized transform coefficients. The inverse transform block 154 converts the quantized transform coefficients into the residuals. The reconstruct block 156 obtains the predicted block based on the motion vector and adds the residuals to the predicted block to reconstruct the block.

Note that the operations described for FIGS. 2A and 2B only represent a small subset of the operations that encoder and decoder use. In various implementations, the encoder and decoder use various alternative or additional operations.

In some examples any of the data used in encoding or decoding is stored in a memory that is part of or external to the encoder or decoder.

Figure 3:
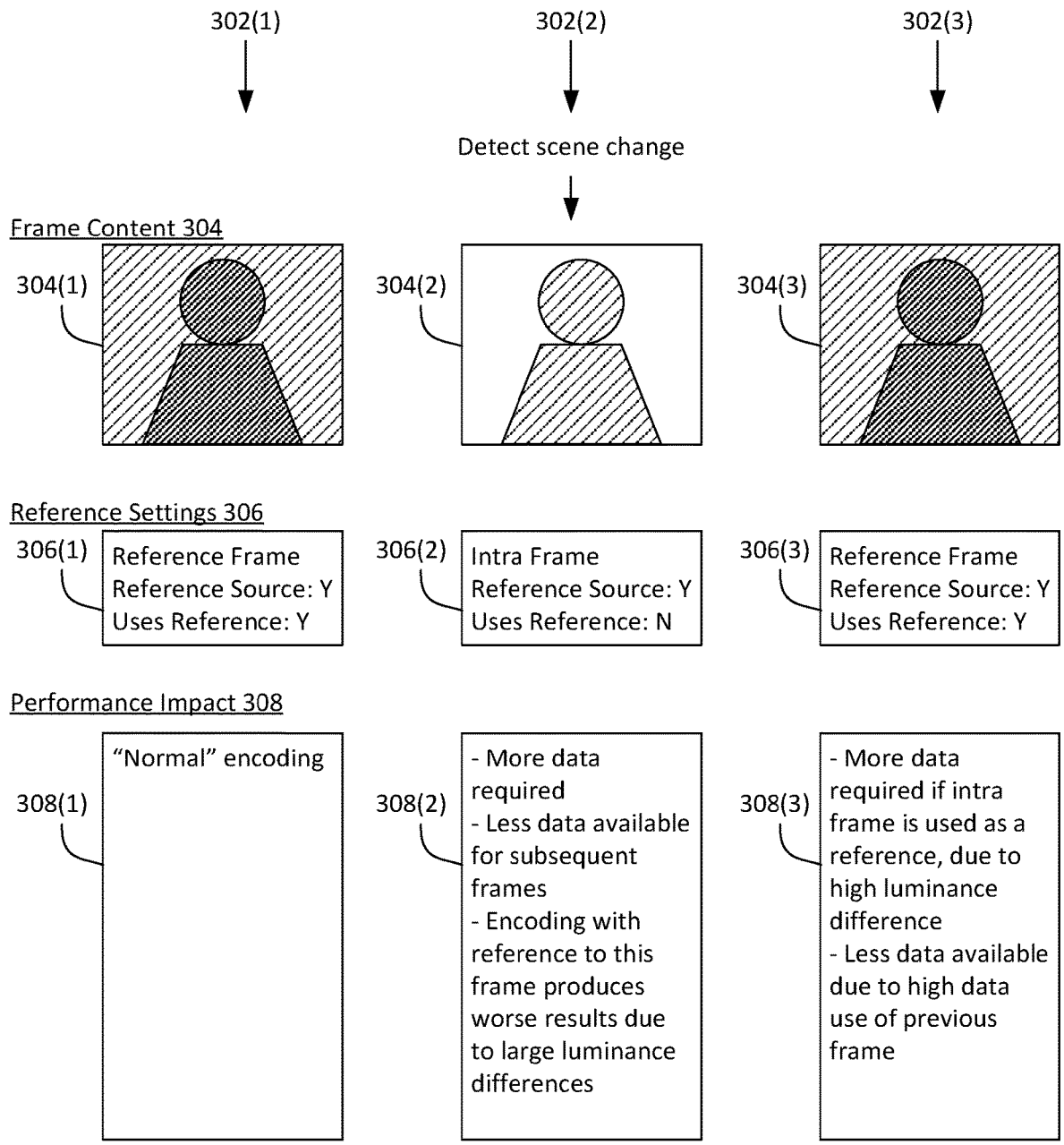
FIG. 3 illustrates an example technique for encoding a set of frames in which one of the frames exhibits a "flash," according to an example.

FIG. 3 illustrates an example technique for encoding a set of frames 302 in which one of the frames 302 exhibits a "flash," according to an example. Specifically, FIG. 3 illustrates 3 frames 302—a first frame 302(1), a second frame 302(2), and a third frame 302(3). The first frame 302(1) and the third frame 302(3) exhibit a "normal" brightness level and the second frame 302(2) exhibits a flash—a large increase in brightness with respect to the first frame 302(1) and third frame 302(3).

In the technique of FIG. 3, the pre-encoding analysis block 122 determines that the second frame 302(2) is a scene change due to the significant difference in content between the second frame 302(2) and other frames (e.g., the first frame 302(1)). More specifically, the second frame 302(2) has significant luminosity differences with such other frames, and these differences are significant enough to be interpreted by the pre-encoding analysis block 122 as a scene change. This change in luminosity is shown in frame content 304, where second frame content 304(2) appears lighter than either the first frame content 304(1) or the third frame content 304(3).

In response to determining that the second frame 302(2) is a scene change, the pre-encoding analysis block 122 designates the second frame 302(2) as an intra frame (I-frame). As shown by the reference settings 306, the reference settings 306(2) for the second frame 302(2) indicate that the second frame 302(2) is encoded as an intra frame. This encoding means that the second frame 302(2) is able to be a reference source for other frames and that the second frame 302(2) does not use any other frame as a reference. Being able to be used as a reference ("reference source: y") means that the pre-encoding analysis block 122 is permitted to (and, in some instances, does) encode frames other than the second frame 302(2) by using blocks of the second frame 302(2) as a reference. Not using other frames as a reference means that in encoding the second frame 302(2), the pre-encoding analysis block 122 is not permitted to use other blocks as a reference. The pre-encoding analysis block 122 does not determine that the first frame 302(1) or the third frame 302(3) are a scene change and thus determines that those frames should be encoded as a reference frame. As a result, the pre-encoding analysis block sets the reference settings 306 such that those frames can be used as a reference and can use other frames as a reference.

The performance impact 308 of the reference settings 306 for each frame is also illustrated. For the first frame 302(1), this frame is encoded "normally," meaning simply that there is no impact of setting the second frame 302(2) as an intra frame. Regarding the second frame 302(2), the performance impact 308(2) is that more data is required than if that frame were not encoded as an intra frame, that less data is available for subsequent frames, and that allowing encoding with reference to the second frame 302(2) produces worse results (e.g., worse compression) than if such reference were disallowed, since reference to a different frame (e.g., the first frame 302(1)) would produce better results, as that frame is more similar to the subsequent frames (e.g., third frame 302(3)). Additionally, for the third frame 302(3), if this frame is encoded with reference to the previous frame, then more data is used, as the luminance values differ greatly. In addition, since the previous frame used up more data than if that frame were a reference frame rather than an intra frame, there is less data available for the third frame 302(3), meaning that the quality of that frame is reduced as compared with a situation in which the second frame 302(2) were not encoded as an intra frame and thus consumed less data.

As can be seen, treating a frame having a flash as a scene change and thus encoding that frame as an intra frame produces significant drawbacks. Therefore, techniques are provided herein to detect a flash in a frame and avoid classifying such a frame as an intra frame. The techniques also provide additional tweaks to improve encoding performance for that frame and other neighboring frames.

Note that although the discussing with respect to FIG. 3 indicates that flashes are encoded as scene changes and thus intra frames, it is possible for some flashes to instead not be encoded as scene changes, if the flash intensity is relatively weak.

Figure 4:
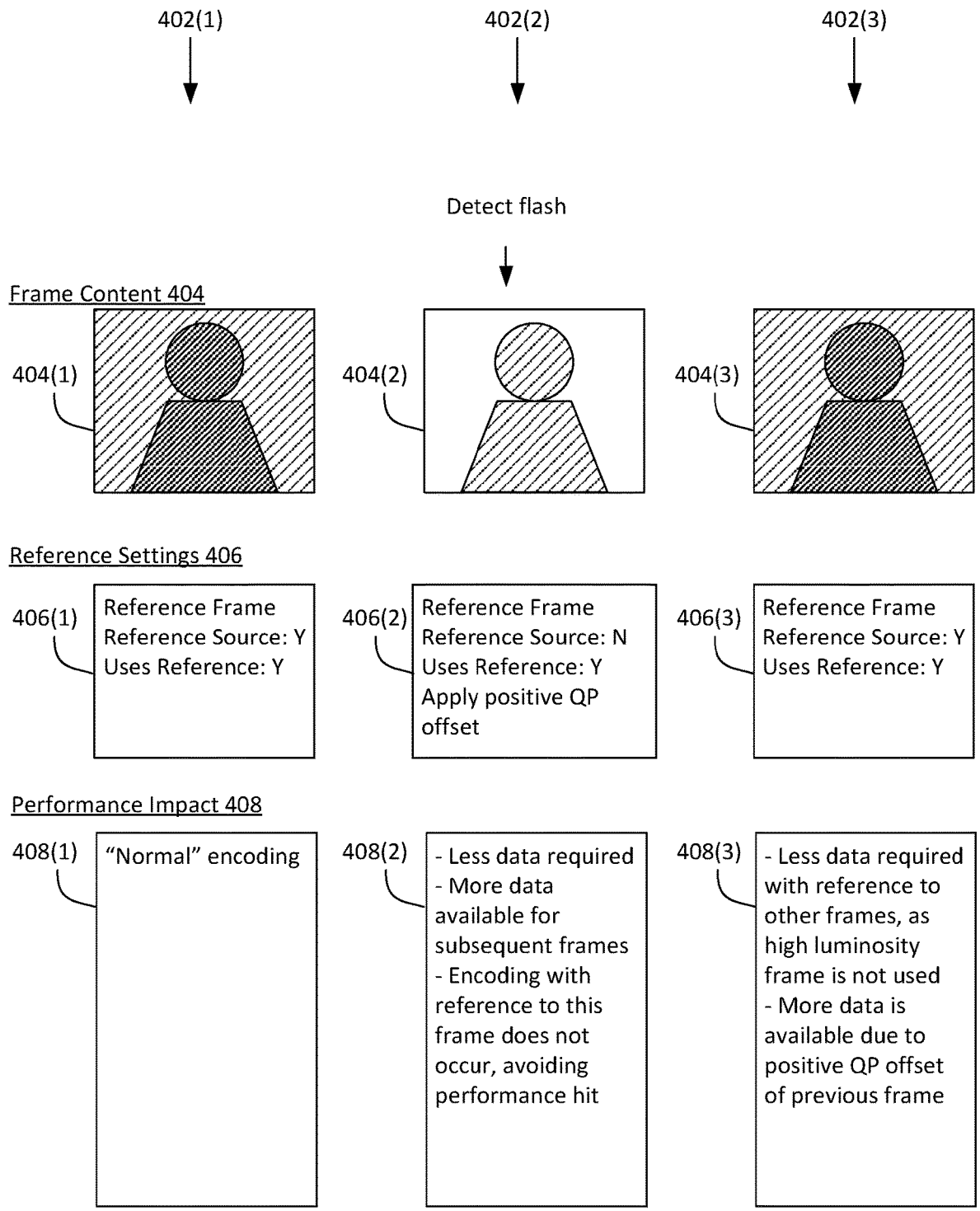
FIG. 4 illustrates a technique in which the encoder detects that a frame exhibits a flash and, in response to that detection, refrains from classifying that frame as a scene change, according to an example.

FIG. 4 illustrates a technique in which the encoder 120 detects that a frame exhibits a flash and, in response to that detection, refrains from classifying that frame as a scene change, according to an example.

Three frames 402 are shown in FIG. 4. As shown by frame content 404, the second frame 402(2) exhibits a flash, while the first frame 402(1) and the third frame 402(3) do not exhibit a flash. Again, a flash means that the luminosity of the frame is significantly greater than the luminosity of the other frames.

In response to detecting the flash, the pre-encoding analysis block 122 designates the second frame 402(2) as having the reference settings 406(2). Specifically, the pre-encoding analysis block 122 sets the second frame 402(2) as a reference frame, rather than an intra frame. Additionally, the pre-encoding analysis block 122 sets the second frame 402(2) to not be used as a reference source for other frames. Additionally, the pre-encoding analysis block 122 applies a positive quantization parameter ("QP") offset to this frame. Regarding the other illustrated frames 402, the pre-encoding analysis block 122 does not change the way in which such frames 402 are encoded. For example, as shown in the reference settings 406, the pre-encoding analysis block 122 encodes both the first frame 402(1) and the third frame 402(3) as a reference frame, acting as a reference source, and using other frames as a reference.

The performance impact 408 indicates the performance of treating the second frame 402(2) as a reference frame rather than an intra frame, and of applying the other reference settings illustrated. For the first frame 402(1), this frame is encoded "normally," meaning no change is occurred as compared with a situation in which the second frame 402(2) does not contain a flash. For the second frame 402(2), the following consequences are applied: less data is required for encoding this frame, because the frame is encoded with reference to other frames, and because of the positive QP offset; there is more data available for subsequent frames (as compared with the situation of FIG. 3), since less data is required; and encoding with reference to the second frame 402(2) does not occur, which avoids the performance hit related to encoding with reference to a frame having a large luminosity difference, as described with respect to FIG. 3. For the third frame 402(3), the following consequences are applied: less data is required for encoding the frame (as compared with the scenario of FIG. 3), since encoding with reference to the high luminosity frame (the second frame 402(2)) does not occur; and more data is available for the third frame 402(3), due to the positive QP offset of the previous frame (in other words, because the second frame 402(2) consumes less data than in FIG. 3, more data is available for the third frame 402(3) than in FIG. 3).

In some examples, the QP offset is a positive offset (addition) applied to blocks (e.g., all blocks) of the frame. The positive QP offset modifies the QPs of such blocks to a value that is different than if such offset were not applied. In other words, the encoder 120 determines the QP for blocks of the frame using certain mechanisms, and this additional offset adjusts the QP further as compared with the QP determined by such mechanisms.

Note that, regarding the reference settings 406, the causing a frame 402 to be treated as a reference frame or as an intra-frame affects prediction operations that occur, for example, in the prediction block 124. In examples, the prediction block 124 is the block that encodes blocks as an indication of a reference frame plus a residual. Thus, the settings for whether frames can reference which other frames affect operations of the prediction block 124 by allowing or preventing selection of reference blocks from particular frames according to the reference settings 406.

In summary, in response to detecting a frame having a flash, the pre-encoding analysis block 122 applies the reference settings 406(2) illustrated in FIG. 4 to such frame. These settings improve the encoding quality by affording less of a data budget to the frame with the flash, thus providing more of such budget to other frames. These settings also improve the encoding quality by preventing encoding of other frames with reference to the frame including the flash. This action increases quality since encoding with reference to the flash frame reduces quality and/or increases the amount of data required, due to the large luminosity difference, as described elsewhere herein.

In some examples, the pre-encoding analysis block 122 detects a sequence of consecutive frames that include a flash. In some such examples, the pre-encoding analysis block 122 uses the reference settings 406(2) illustrated for the second frame 402(2) for each such flash frame.

In some examples, the pre-encoding analysis block 122 includes an independent scene change detector and an independent flash detector. The scene change detector operates in any technically feasible manner to determine whether a particular frame is a scene change. The flash detect operates according to the principles described herein. In some examples, the pre-encoding analysis block 122 determines that a frame is a flash frame in the event that both the scene change detector detects the frame as a scene and the flash detector detects the frame as a flash. In such examples, the pre-encoding analysis block 122 determines that the frame is not a flash frame in the event that either the scene change detector determines that the scene change has not occurred or the flash detector determines that a flash has not occurred.

In some examples, the pre-encoding analysis block detects that a flash occurs according to following technique (in some examples, the following description describes how the flash detector detects that a frame is a flash frame).

According to a first implementation of this technique, the pre-encoding analysis block 122 determines mean frame data for each frame and sum of absolute differences data item for each frame. The mean frame data item for a frame is the average for the pixels of a frame. The sum of absolute differences data item is a data item that is related to the sum of absolute differences between the pixels of a frame and the pixels of another frame (e.g., the immediately prior frame). The sum of absolute differences is the sum of the absolute value of the difference of each corresponding pixel of two frames. In an example, the absolute value of the difference of the pixel at location 1,1 for both frames is added to the absolute value of the difference of the pixel at location 1,2 for both frames, and that sum is added to the absolute value of the difference of the pixel at location 1,3 for both frames, and so on.

Based on the above information, the pre-encoding analysis block 122 determines that a particular frame (e.g., frame 2) has a flash in the event that a mean frame data item condition is satisfied and that a sum of absolute differences data item condition is satisfied.

The mean frame data item condition is satisfied in the event that the mean frame data item for frame 2 is greater than both the mean frame data item of frame 1 and of frame 3 by at least a first threshold amount, and that the mean frame data items for frame 1 and 3 are significantly similar—that is, the difference between those values is less than a second threshold. Frames 1, 2, and 3 constitute a consecutive sequence of frames with higher numbers occurring later in time. Stated more plainly, the mean frame data item condition is satisfied in the situation that the mean of the pixels for frame 2 is significantly higher than the mean of the pixels of frames 1 and 3 and the mean for the pixels of frames 1 and 3 are significantly similar. The mean frame data item condition is not satisfied if any of the above conditions are not true (e.g., if the mean frame data item of frame 2 is not significantly different from that of frame 1 or frame 3 or if the mean frame data item of frame 1 is not significantly similar to that of frame 3).

The sum of absolute difference data item condition is satisfied in the event that the sum of absolute differences data item for frame 2 is sufficiently greater than that of frame 1 (e.g., the sum of absolute differences data item for frame 2 is greater than that for frame 1 by at least a threshold amount). Note that the sum of absolute differences for a frame means the sum of the differences of that frame to the frame prior. So the sum of absolute differences for frame 2 means the sum of the absolute values of the differences of the pixel values of frame 2 with those of frame 1 and the sum of absolute differences for frame 1 means the sum of the absolute values of the differences of the pixel values of frame 1 with those of the prior frame (e.g., frame 0). The sum of absolute difference data item condition is not satisfied in the event that the sum of absolute differences data item for frame 2 is not sufficiently greater than that of frame 1 (e.g., that of frame 2 is not a threshold amount above that of frame 1). In different examples, the various thresholds described herein differ or are the same and, in various examples, are set by any technically feasible means, such as through experimentation.

In some examples, the sum of absolute difference data item is a histogram sum of absolute difference data item. More specifically, the sum of absolute differences data item is the sum of absolute differences of histogram bin values for two different frames. The histogram bin values are each equal to the number of elements (e.g., pixels) in a histogram bin for each image. The histogram bins are groups of pixel values between a low pixel value and a high pixel value. The pixel value is a value representative of the color of the pixel such as a value of a single component of a pixel (such as the luminance component of the YUV (luminance-blue projection-red projection or one of the colors of red-green-blue (RGB) color) or a single number formed by combining components (e.g., YUV or RGB), or can be any other technically feasible values). In an example, the pixel values are expressed in the YUV color space. For a 24 bit color in such a color space, there are 256 bins, with each bin having the same luminance component, and with there being 65536 color values per bin. The histogram bin value is the number of pixels of that frame whose value fall within that bin (in the example, whose luminance component is the same). The histogram sum of absolute differences for a frame is the sum of the absolute value of the difference between each corresponding bin value for a frame and a previous frame. In an example, the histogram sum of absolute differences for a frame is the absolute value of the difference between the value of a bin having a first luminance value (e.g., 0) for a first frame and a frame immediately prior to that frame, added to the difference between the value of a bin covering the next highest luminance value (e.g., 1), added to the difference between the value of a bin covering the next highest luminance value, and so on.

In some examples, the histogram sum of absolute differences data item has a minimum threshold value enforced. In other words, in calculating the histogram sum of absolute differences data item, if that value is not above a threshold value, then the pre-encoding analysis block 122 sets that value to the threshold value and if the value is above the threshold value, then the pre-encoding analysis block 122 does not set that value to the threshold value. The threshold ensures that the sum of absolute differences value for a flash frame is high enough. More specifically, this threshold ensures that the frames before and after a flash frame have a high absolute sum of absolute differences. More specifically, the threshold prevents a situation in which many false positives occur due to the sum of absolute differences being too small.

In some examples, the sum of absolute differences data item is expressed according to the following expressions. In some examples, the pre-encoding analysis block first downscales the input frame to a quarter of its original resolution, such that:

$$sW = \frac{W}{4} \text{ and } sH = H/4$$

Where W is the width in pixels of the original, non-downscaled frame, H is the height in pixels of the original, non-downscaled frame, sW is the downscaled width in pixels of the downscaled frame, and sH is the downscaled height in pixels of the downscaled frame. In some examples, downscaling occurs according to a factor other than four, and in other examples, downscaling is not applied at all.

Bins are calculated in the following manner. The pre-encoding analysis block 122 calculates a "quantized" pixel value $Q_n(x)$ where n is the frame number and x is the pixel position number as follows:

$$Q_n(x) = 32 \times \left\lfloor \frac{P_n(x)}{32} + \frac{1}{2} \right\rfloor$$

This quantization categorizes an 8-bit pixel into one of 8 bins. Specifically, the pixel value at pixel position x from frame n $P_n(x)$ is divided by a quantization number (32 in the example), and that result is added to one half. The floor of this result is taken and the result is multiplied by 32. This result is a quantized value. Removing the multiplication by the quantization number gives the bin number (e.g., bin number 0-7). It should be understood that the number 32 can be replaced with any number to quantize into any number of bins, and that the addition by one half can be removed or modified to a different number.

With these quantized pixel values, the pre-encoding analysis block 122 generates histogram values $Hs_n(i)$. Again, n is the frame value. i is the bin number. $Hs_n(i)$ for frame n is the number of pixels that fall within bin i. The pre-encoding analysis block 122 calculates the sum of absolute differences $HD_n$ for frame n in the following manner:

$$HD_n = \sum |HS_n(i) - HS_n(i)| \quad 0 \le i < 8$$

According to the above expression, the histogram sum of absolute differences $HD_n$ equals the sum of the absolute value of the differences of the histogram values for each bin of frame n and frame n−1. Finally, a maximum threshold is applied to $HD_n$, as in the following expression:

$$HD_n = \max\left(HD_n, \frac{W \times H}{256}\right)$$

In the above expression, the new value of $HD_n$ is set to the maximum of $HD_n$ and a threshold value equal to the original, non-downscaled resolution divided by 256 (which can vary and is, in some examples, equal to the number of bits in a pixel).

In some examples, the pre-encoding analysis block 122 determines the mean frame data item according to the following expression:

$$E_n = \frac{1}{W \times H} \sum P_n(x)$$

In this expression, $E_n$ is the mean frame data item for frame n. To generate this value, the pre-encoding analysis block 122 generates the sum of all pixel values $P_n(x)$, where n is the frame number and x is the pixel number. The pre-encoding analysis block 122 divides this sum by the number of pixels, equal to W×H, or the width in pixels times the height in pixels.

In an example, the pre-encoding analysis block 122 evaluates the following expression to determine whether sum of absolute differences data item condition is satisfied:

$$HD_n > TF_1 \times HD_{n-1}$$

Where $TF_1$ is the sum of absolute differences data item condition threshold. In other words, if the sum of absolute differences data item for the current frame is greater than $TF_1$ multiplied by the sum of absolute differences data item for the immediately prior frame, then the condition is satisfied and if not, then the condition is not satisfied.

In an example, the pre-encoding analysis block 122 evaluates the following expressions to determine whether the mean frame data item condition is met:

$$|E_n - E_{n-1}| > TF_2$$
$$|E_n - E_{n+1}| > TF_2$$
$$|E_{n+1} - E_{n-1}| < TF_3$$

If all of the above expressions evaluate as true, then the pre-encoding analysis block 122 determines that the mean frame data item condition is met and if any of those expressions do not evaluate as true, then the pre-encoding analysis block 122 determines that the mean frame data item condition is not met. Again, $E_n$ is the mean frame data item for frame n. Thus, if the difference between the mean frame data item immediately after (n+1) subject frame (n) and the mean frame data item immediately prior (n−1) to the subject frame (n) is less than threshold $TF_3$, if the difference between the mean frame data item of the subject frame and the immediately prior frame is more than threshold $TF_2$ and the difference between the mean frame data item of the subject frame and the immediately subsequent frame is more than threshold $TF_2$, then the mean frame data item condition is met, and if at least one of those expressions is not true, then the mean frame data item condition is not met.

In some examples, the pre-encoding analysis block 122 uses the above expressions to detect a consecutive sequence of flash frames. To do this, in an example, wherever the frame number n−1 is used, either n−1 or n−2 can be used and whenever the frame number n+1 is used, either n+1 or n+2 can be used. For example, if conditions need to be satisfied for frames n−1 and n+1, then if those conditions are satisfied instead for frames n−1 and n+2, or for frames n−2 and n+1, then the pre-encoding analysis block 122 determines that frame n is a flash frame. This would work for a consecutive sequence of two frames. For three frames, anything between n−1 and n−3 could be used and anything between n+1 and n+3 could be used. In general, to detect a sequence of x frames as flashes, the conditions could be satisfied for frames n−1 to n−x and for frames n+1 to n+x.

Figure 5:
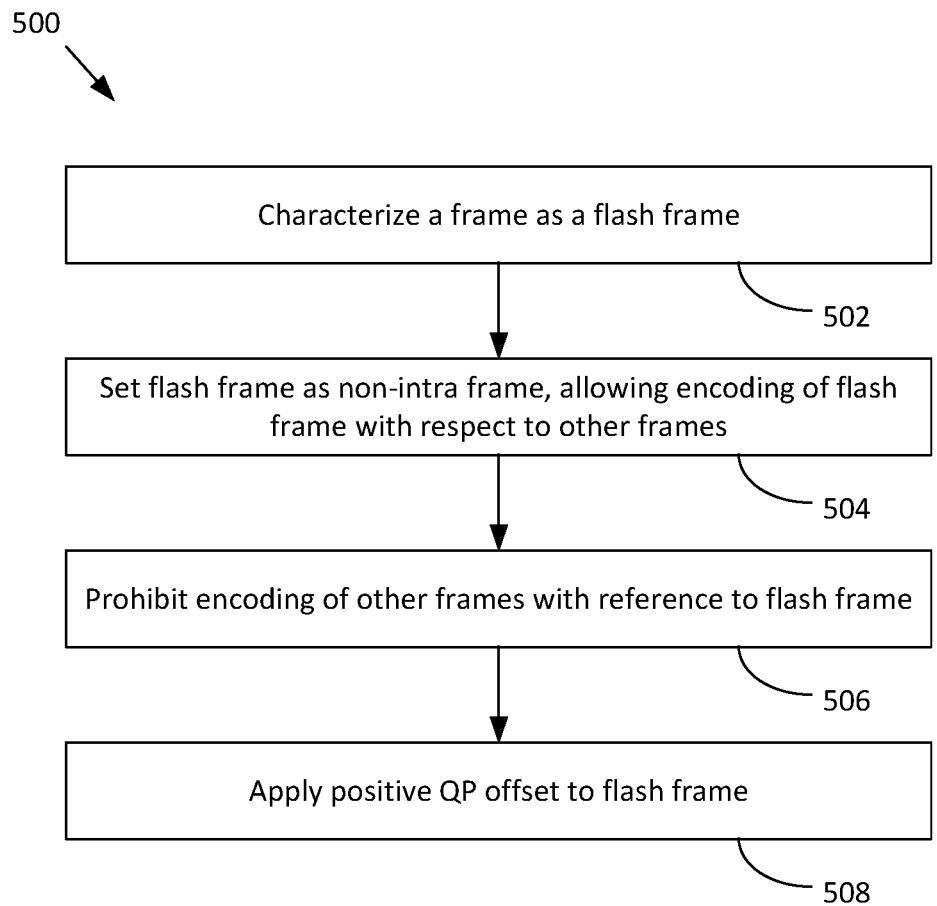
FIG. 5 is a flow diagram of a method for encoding video, according to an example.

FIG. 5 is a flow diagram of a method 500 for encoding video, according to an example. Although described with respect to the system of FIGS. 1-4, those of skill in the art will understand that any system, configured to perform the steps of the method 500 in any technically feasible order, falls within the scope of the present disclosure.

At step 502, the pre-encoding analysis block characterizes a frame as a flash frame. Techniques are disclosed herein for characterizing frames as flash frames. For step 502, any such technique can be utilized. Briefly, such techniques include evaluating one or both of a mean frame data item condition and a sum of absolute differences data item condition. Various examples for evaluating these conditions are provided elsewhere herein. As described, in some examples, in the event that the pre-encoding analysis block 122 determines that the mean frame data item condition is satisfied and the sum of absolute differences data item condition is satisfied, the pre-encoding analysis block 122 determines that the frame is a flash frame. Again, additional details and techniques are described elsewhere herein.

At step 504, in response to determining that a frame is to be characterized as a flash frame, the pre-encoding analysis block 122 sets the frame as a non-intra frame (e.g., reference frame), which allows encoding of the frame with respect to other frames (as described for example with respect to FIG. 4, such as with respect to reference settings 406(2)). At step 506, the pre-encoding analysis block 122 prohibits encoding of any other frame with reference to the flash frame. As stated elsewhere herein, this prohibition prevents the large amount of data needed for encoding a frame without a flash with reference to a frame with a flash.

At step 508, the pre-encoding analysis block 122 applies a positive quantization parameter offset to the flash frame. This positive quantization parameter offset reduces the amount of data utilized by that frame. In other words, in some examples, by causing the quantization parameters of the blocks to have a higher quantization parameter than if such offset were not applied, the amount of data needed to quantify the transform (e.g., discrete cosine transform) coefficients is reduced as compared with not applying such QP offset. Because the frame is associated with a flash, the frame can tolerate quality loss associated with a higher QP offset without a large impact on visual quality for a human viewer. Moreover, the bit budget that would be used for such a frame becomes available for another frame.

With the settings applied as in FIG. 5, the encoding 120 encodes the video including the flash frame. This encoding 120 can be performed in any technically feasible manner, such as has been described with respect to FIG. 2A.

Each of the units illustrated in the figures represent hardware circuitry configured to perform the operations described herein, software configured to perform the operations described herein, or a combination of software and hardware configured to perform the steps described herein. For example, the processor 102, memory 104, any of the auxiliary devices 106, including the encoder 120 and the pre-encoding analysis block 122, prediction block 124, transform block 126, and entropy encode block 128 as well as the decoder 150, entropy decode block 152, inverse transform block 154, reconstruct block 156, and shade de-normalization block 158, and/or the storage 108, are implemented fully in hardware, fully in software executing on processing units, or as a combination thereof.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing video, the method comprising:
    characterizing a frame as a flash frame;
    setting the flash frame as a non-intra frame;
    prohibiting encoding of frames other than the flash frame with reference to the flash frame; and
    applying a positive quantization parameter ("QP") offset to the flash frame.

2. The method of claim 1, further comprising encoding the flash frame.

3. The method of claim 1, wherein characterizing the frame as the flash frame is performed based on one or both of a mean frame data item condition and a sum of absolute difference data item condition.

4. The method of claim 3, wherein the mean frame data item condition is satisfied in the event that a mean frame data item for the frame is above a mean frame data item threshold.

5. The method of claim 4, wherein the mean frame data item comprises a mean of pixel values of the frame.

6. The method of claim 3, wherein the sum of absolute differences data item condition is satisfied in the event that a sum of absolute differences data item is above a sum of absolute differences data item threshold.

7. The method of claim 6, wherein the sum of absolute differences data item is based on a histogram.

8. The method of claim 7, wherein the sum of absolute difference data item comprises a sum of histogram bin value differences between the frame and an immediately prior frame.

9. The method of claim 1, wherein the frame is part of a consecutive sequence of frames each characterized as a flash frame.

10. A system comprising:
a memory configured to store a frame; and
a pre-encoding analysis block configured to:
characterize the frame as a flash frame;
set the flash frame as a non-intra frame;
prohibit encoding of frames other than the flash frame with reference to the flash frame; and
apply a positive quantization parameter ("QP") offset to the flash frame.

11. The system of claim 10, wherein the pre-encoding analysis block is part of an encoder that is configured to encode the flash frame.

12. The system of claim 10, wherein characterizing the frame as the flash frame is performed based on one or both of a mean frame data item condition and a sum of absolute difference data item condition.

13. The system of claim 12, wherein the mean frame data item condition is satisfied in the event that a mean frame data item for the frame is above a mean frame data item threshold.

14. The system of claim 13, wherein the mean frame data item comprises a mean of pixel values of the frame.

15. The system of claim 12, wherein the sum of absolute differences data item condition is satisfied in the event that a sum of absolute differences data item is above a sum of absolute differences data item threshold.

16. The system of claim 15, wherein the sum of absolute differences data item is based on a histogram.

17. The system of claim 16, wherein the sum of absolute difference data item comprises a sum of histogram bin value differences between the frame and an immediately prior frame.

18. The system of claim 10, wherein the frame is part of a consecutive sequence of frames each characterized as a flash frame.

19. A non-transitory computer-readable medium storing instructions that, when executed by a processor, cause the processor to perform operations comprising:
characterizing a frame as a flash frame;
setting the flash frame as a non-intra frame;
prohibiting encoding of frames other than the flash frame with reference to the flash frame; and
applying a positive quantization parameter ("QP") offset to the flash frame.

20. The non-transitory computer-readable medium of claim 19, wherein the operations further comprise encoding the flash frame.

* * * * *